United States Patent [19]

Tanaka et al.

[11] Patent Number: 6,097,167
[45] Date of Patent: Aug. 1, 2000

[54] WATER DROP DETECTOR OR TRANSPARENT SUBSTRATE AND INITIATING METHOD AND OUTPUT STABILIZING METHOD THEREFOR

[75] Inventors: Shuhei Tanaka; Tadashi Koyama; Keiji Tsunetomo, all of Osaka, Japan

[73] Assignee: Nippon Sheet Glass Co., Ltd., Osaka, Japan

[21] Appl. No.: 09/120,193

[22] Filed: Jul. 22, 1998

[30] Foreign Application Priority Data

| Jul. 22, 1997 | [JP] | Japan | 9-195538 |
| Jul. 22, 1997 | [JP] | Japan | 9-195542 |
| Jul. 22, 1997 | [JP] | Japan | 9-195543 |

[51] Int. Cl.$^7$ ............................................. G05B 5/00
[52] U.S. Cl. ............................................ 318/483; 318/480
[58] Field of Search ............................ 318/483, DIG. 2, 318/480; 340/601, 602

[56] References Cited

U.S. PATENT DOCUMENTS

| 4,595,866 | 6/1986 | Fukatsu et al. ............... 318/480 X |
| 4,859,867 | 8/1989 | Larson et al. ..................... 307/10.1 |
| 4,956,591 | 9/1990 | Schierbeek et al. ................ 318/483 |
| 5,015,931 | 5/1991 | Muller ............................... 318/483 |
| 5,059,877 | 10/1991 | Teder ................................ 318/444 |
| 5,276,389 | 1/1994 | Levers ............................... 318/444 |
| 5,323,637 | 6/1994 | Bendicks et al. .................. 73/29.01 |
| 5,483,346 | 1/1996 | Butzer ................................ 356/369 |
| 5,508,595 | 4/1996 | Schaefer ............................ 318/444 |
| 5,568,027 | 10/1996 | Teder ................................ 318/483 |
| 5,666,037 | 9/1997 | Reime ............................... 318/483 |
| 5,804,817 | 9/1998 | Seiler et al. .................... 250/227.25 |
| 5,949,150 | 9/1999 | MacDonald .................... 318/483 X |

FOREIGN PATENT DOCUMENTS 2-67945  3/1990  Japan .

*Primary Examiner*—Brian Sircus
*Attorney, Agent, or Firm*—Pillsbury Madison & Sutro LLP

[57] ABSTRACT

A water drop detection device for detecting an amount of water drops present upon a surface of a transparent substrate in which a light source with a driver circuit guides light into the substrate so as to cause the light to under go internal reflection within the substrate. The light source has a light emitting element and a receiving light sensing element for detecting the light output from the emitting element. The light outputted from the light emitting element is modulated by a predetermined frequency. A signal corresponding to the modulated component is separated from the output signal of the receiving light sensing element. The output light emission of the light emitting element is controlled as a desired value by feeding the separated signal back to the driver circuit of the light emitting element.

4 Claims, 5 Drawing Sheets

WATER DROP DETECTOR OR TRANSPARENT SUBSTRATE AND INITIATING METHOD AND OUTPUT STABILIZING METHOD THEREFOR

BACKGROUND OF THE INVENTION

1. Field of the Invention

The present invention relates to a water drop detector on a transparent substrate for detecting the amount of water drops adhering upon a surface of the transparent substrate by a light emitting element and a light receiving element, and further to an initiating method for the water drop detector used in a wiper driving control device and a stabilizing method for an output therefrom.

2. Description of Related Art

Conventionally, as is described in Japanese Patent Laying-Open No. Hei 2-67945 (1990), there is already known a water drop detector (a rain sensor) for a window glass (windshield) of a vehicle, which comprises a footlight means comprising for example a light emitting element and a detection means comprising for example a light receiving element, wherein light is irradiated from the footlight means towards the windshield, and if an output signal from the detection means which receives reflection light is within a predetermined range over a level for indicating no water drops, it is determined that the water drops stick or adhere upon only the outside of the windshield, while if it exceeds the predetermined range over that level of indicating no water drops, it is determined that the water drops are sticking or adhering upon an interior surface of the windshield.

Further, as a control device applying such a rain sensor, there is already known a wiper control device of a type which is sensitive to the presence of water drops, in which a light emitting means and a light receiving means are provided inside of the windshield, opposite to each other with a distance therebetween, in a wiping area swept by a wiper for wiping off the outside surface of the windshield, whereby it is decided whether water drops are present upon the outside surface of the windshield or not on the basis of the output level of the signal output from the light receiving means, before and after the operation of the wiper, so as to actuate it.

However, with the conventional water drop detector, no temperature compensation is made with respect to the output of the light emitting element, such as a LED (a light emitting diode) nor for the output signal of the light receiving element, such as a PD (a photo diode). Therefore, the output level of the light output from the light emitting element fluctuates depending on the ambient temperature thereof, and also the output signal level from the light receiving element fluctuates depending on the ambient temperature thereof.

Accordingly, if the output signal level from the light receiving element is set with a plurality of levels (for instance, 3-stages or 4-stages) and thereafter driving the wiper(s) depending on the respective output signal levels, i.e., with a low speed, with an intermittent (on and off) operation, or with a high speed, there is a drawback in that effective operation cannot be obtained because of the fluctuation in the output signal level of the light receiving element depending on the ambient temperature.

Further, the light amount which the light receiving element receives from outside changes greatly depending on the environment in which the water drop detection device is used, i.e., it reaches as much as one hundred and fifty thousand (150,000) luxunder strong sunshine in mid-summer, for instance, while it reaches only to several lux in darkness at night. With such a change of ambient light conditions, the water drop detector can easily malfunction.

Moreover, with the conventional wiper control device that is sensitive to water drops, there is another drawback in that a wiper driving signal is received even in the case where no water drops adhere upon the outside surface of the windshield, and in particular, when operation of the rain sensor is initiated (i.e., when turning it by switching on an electric source), if water drops adhere on the outside surface of the windshield, the wiper can be driven reciprocally only at one time.

Furthermore, with the conventional wiper control device that is sensitive to water drops, the output signal from the light receiving means fluctuates in the following cases, even when no water drops adhere upon the outside surface of the windshield. For example, one case is where the outside surface of the windshield is contaminated or dirty, another case is where the light emission output fluctuates due to any reason (such as a change in the output of the light emission source with the passage of time), and another case is where the amplification factor of various circuits fluctuates due to variations in the ambient temperature. In addition, noise due to external sources can also cause undesirable results.

Accordingly, the prior art has the drawback that the light receiving means might output a signal indicative that water drops adhere on the outside surface of the windshield in the cases mentioned the above, causing the wiper(s) to be driven when it is not necessary.

SUMMARY OF THE INVENTION

In accordance with the present invention, for resolving the drawbacks in the conventional art mentioned above, there is provided a water drop detector on a transparent substrate, for detecting a level of an amount of water drops adhering to or present upon a surface of said transparent substrate, comprising:

a light emitting means for guiding light into said transparent substrate so as to cause total internal reflection to occur upon interior surfaces of said transparent substrate, and including a driver circuit therein; and a light receiving means for receiving light reflected within said transparent substrate, wherein said light emitting means comprises:

a light emitting element; and a receiving light sensing element for detecting light output from said light emitting element, and further comprising:

means for modulating the output light from said light emitting element with a predetermined frequency;

means for separating a signal corresponding to the modulated component from the output signal of said receiving light sensing element; and means for controlling an output of light emission of said light emitting element to a desired value by feeding the separated signal back to the driver circuit of said light emitting element.

Thereby, it is possible to maintain the output of the light emission of the light emitting element at the desired value in spite of any changes in the ambient temperature of the light emitting means.

Further, according to the present invention, there is provided a water drop detector on a transparent substrate, for detecting a level of an amount of water drops adhering upon a surface of said transparent substrate, comprising:

a light emitting means for guiding light into said transparent substrate so as to cause total internal reflection to occur upon interior surfaces of said transparent substrate, including a driver circuit therein;

a light receiving means for receiving light reflected within said transparent substrate; and means for modulating the output light from said light emitting element with a predetermined frequency, wherein only the modulated component is detected by said light receiving means.

In addition, according to the present invention, there is provided a method for initiating a rain sensor which detects the amount of water drops adhering upon or present on a front surface of a windshield and outputs a driving signal to a wiper driver device, comprising a light emitting means for guiding light into said windshield so as to cause total internal reflection to occur upon interior surfaces thereof, and a light receiving means for receiving the light reflected within said windshield, wherein an output signal of said light receiving means is inputted into the wiper driver device through a delay means when initiating the rain sensor.

Therefore, because of the delay means, no unnecessary signal is outputted from the rain sensor to the wiper driver circuit, thereby prohibiting the wiper from operating unnecessarily.

Further, according to the present invention, the above-mentioned delay means can be an on-delay timer.

Furthermore, according to the present invention, there is provided a method for stabilizing an output of a rain sensor which detects a level of an amount of water drops adhering upon or present upon a front surface of a windshield and outputs a driving signal to a wiper driver device for driving a wiper, comprising a light emitting means for guiding light into said windshield so as to cause total internal reflection to occur upon interior surfaces thereof, and a light receiving means for receiving the light reflected within said windshield, wherein an amplification factor of an amplifier circuit of said light receiving means is so adjusted that an output signal of said amplifier circuit is a constant value when no water drops adhere upon the front surface of said windshield.

Additionally, according to the present invention, the above-mentioned adjustment of the amplification factor is conducted by feeding back a difference signal between a reference value and the output signal of said amplifier circuit.

Further, according to the present invention, the above-mentioned feedback is conducted at a constant time period, or when the wiper is not driven.

Furthermore, according to the present invention, preferably, the above-mentioned difference signal just before said rain sensor is in a stop condition is memorized, and is fed back when it is initiated once again (next time of operation).

With this, in the case where no water drops adhere upon the front surface of the windshield, since the amplification factor of the amplifier circuit is so adjusted that the output signal of the amplifier circuit of the light receiving means is at a constant, the output signal of the amplifier circuit is maintained at the constant value, even when the output of the light receiving means fluctuates due to any reason, when the amplification factor of the circuit fluctuates due to the change in the ambient temperature, or when fluctuates occur due to outside noise.

Accordingly, even if the rain sensor outputs the signal indicative that water drops adhere upon the outside surface of the windshield, the wiper is not actuated when it is not necessary, thereby enabling advantageous driving of the wiper depending on the condition of rainfall.

DESCRIPTION OF THE PREFERRED EMBODIMENTS

Hereinafter, detailed explanation of the embodiments according to the present invention will be given by referring to attached drawings.

Figure 1:
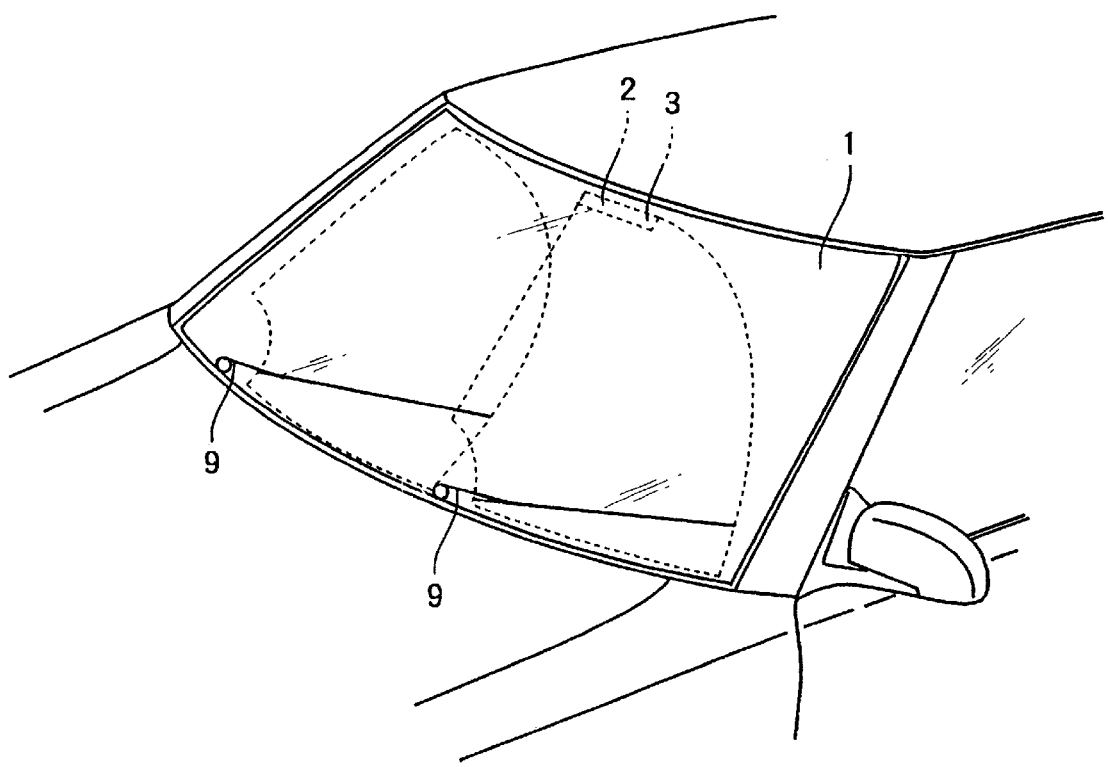
FIG. 1 shows a front part of an automobile to which is applied a water drop detector on a transparent substrate and the initiating method and the output stabilizing method thereof, according to the present invention.

As shown in FIG. 1, a rain sensor 2 is attached with an adhesive (i.e., an adhesive tape) 3, upon an interior side surface of a windshield 1 of an automobile, within a region where an outside surface thereof is wiped by a wiper 9. As the adhesive (i.e., the adhesive tape) 3, a type is selected which has a refractive index almost equal to that (i.e., 1.48) of the windshield 1. Further, as the windshield 1 there is used a soda-lime glass sheet (not necessarily flat) of a thickness of 5 mm, which mainly comprises $SiO_2$. Note that in this specification although one wiper 9 is described, the invention may also be applied to two or more wipers, as indicated in the figure.

Figure 2:
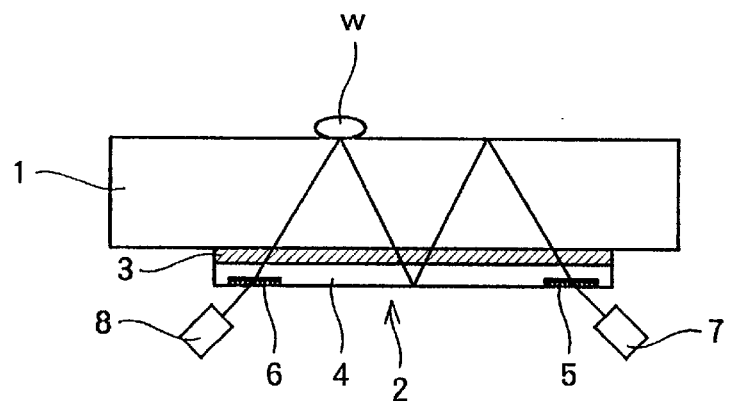
FIG. 2 shows construction of the water drop detector on a transparent sheet of glass, according to the present invention.

The rain sensor 2, as shown in FIG. 2, comprises diffraction gratings 5, 6 which are formed on a surface of a glass substrate 4 by a laser beam. Further, the adhesive 3 is pasted on the entire surface of the glass substrate 4, thereby closely connecting the rain sensor 2 and the windshield 1 to each other.

Furthermore, in the vicinity of one diffraction grating there is provided a light emitting means, which comprises a light emitting element, such as a light emitting diode (LED) or a laser diode (LD) or the like, while in the vicinity of the other diffraction grating 6 there is provided a light receiving means 8, which comprises a light receiving element, such as a photo diode (PD) or the like. The light emitting means 7 and light receiving means 8 can be provided closely contacted with the diffraction gratings 5, 6.

Moreover, preferably, the diffraction gratings 5, 6 are formed directly on the surface of the glass substrate 4 through ablation processing by irradiating a laser beam thereupon.

The term diffraction grating means an optical element in which fine grooves are formed upon the surface of the glass. Mainly, a pitch between the grooves is designed to be within a range from 0.4 to 3 $\mu$m, depending on the intended use thereof. A principal use of the diffraction grating is for separating incident light into its spectrum, and it can be used for separating or bending incident light by an effect of the diffraction thereof in a case where monochromatic light is used as the light source.

Moreover, as the diffraction grating other than that mentioned above, for example, a diffraction grating of the reflection type, a slit-like diffraction grating, or other diffraction gratings which vary in refractive power thereof periodically also can be used for the purposes of the present invention.

Figure 3:
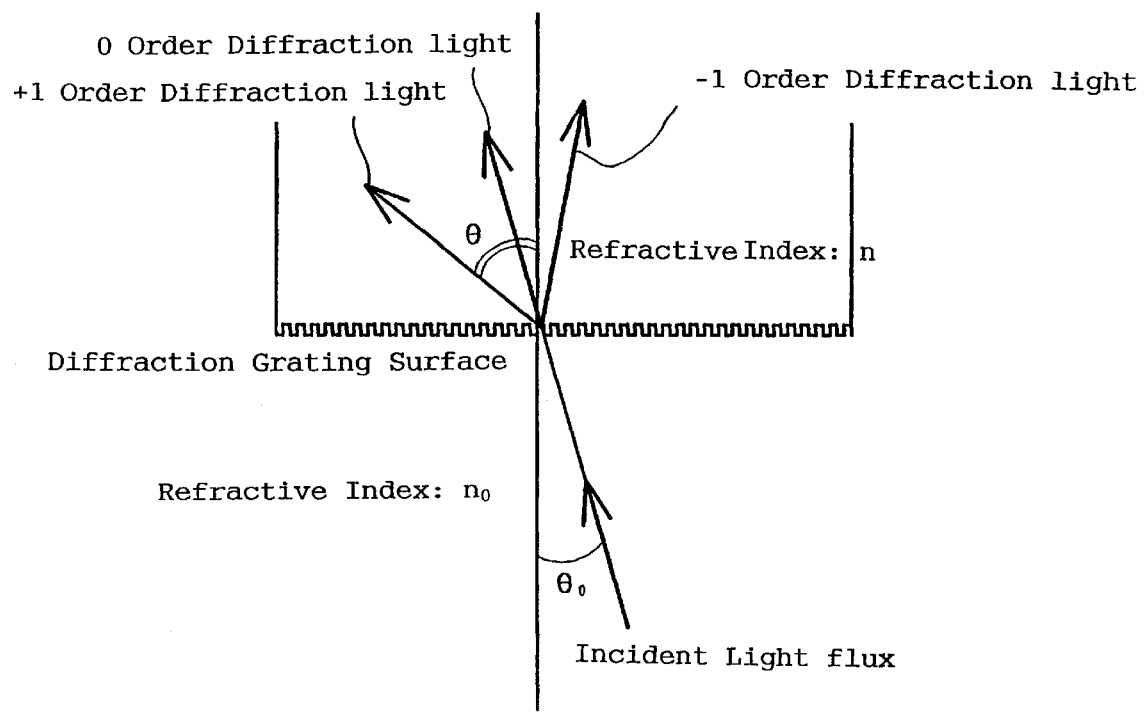
FIG. 3 explains the function of a diffraction grating, according to the present invention.

In the present invention, as the effect of using the diffraction grating, a phenomenon occurs in that diffracted light appears on the basis of a predetermined rule when monochromatic light is incident upon the diffraction grating. As shown in FIG. 3, the diffracted light generates a primary diffracted light lobe at a constant angle with respect to the incident light. Here, also diffracted light lobes of higher order appear, however, since they are small in intensity, the light of the primary lobe is mainly used.

The angular relationship between the incident light and the diffracted light can be represented by the following equation (1), when the incident light transmits through the diffraction gating. Namely, assuming that the angle of the incident light is $\theta_0$, the angle of the diffracted light of m order is $\theta$, the wavelength of the incident light $\lambda$, the pitch of the grooves d, the refractive index of medium at exit side n, and the refractive index of medium at light incident side $n_0$, then the angular relationship is determined as below:

$$n \cdot \sin\theta - n_0 \cdot \sin\theta_0 = m\lambda/d \ (m=0, \pm1, \pm2, \ldots) \quad (1)$$

In the case where the light incident side is air and the light exit side is a transparent plate (for example, glass), since $n_0=1.0$, the angle of the light propagating within the transparent plate can be adjusted by changing the angle of incidence of the light incident onto the diffraction grating.

As mentioned above, by using the diffraction grating, it is possible to introduce light into the transparent plate at an arbitrary angle. Further, by appropriately selecting the incident angle of the light onto the diffraction grating, it is also possible to set it in such manner that the light introduced experiences internal reflection within the transparent plate.

Further, it is also possible to cause the light which is propagating within the transparent plate under total internal reflection to exit into the air on the basis of the same principal mentioned above.

For obtaining the angle of internal reflection upon the boundary surface between the air and the glass, the following calculation is made using Snell's law. A general equation of the Snell's law is shown in equation (2) below:

$$n_0 \cdot \sin\alpha_0 = n \cdot \sin\alpha \quad (2)$$

where, $\alpha$ and $\alpha_0$ define angles with respect to a normal on the boundary surface between the material of refractive index n and a material of refractive index $n_0$ ($\alpha$: the incident angle, $\alpha_0$: the angle of refraction).

In the case where the refractive index of the glass is n=1.48 as mentioned above, and the refractive index of the air $n_0=1$, the condition for internal reflection to occur within the glass plate is $\alpha_0=90°$, and therefore, angle $\alpha=42.5°$ can be obtained from equation (2). Accordingly, if the incident angle $\alpha$ is equal to or greater than this angle (i.e., 42.5°), total internal reflection occurs within the medium of the glass.

In addition, in the case where water is present upon or adhering to the glass plate, the condition under which total internal reflection occurs is that the angle $\alpha$ is equal to 42.5° ($\alpha=64.0°$), by the same calculation. Accordingly, under the condition that the incident angle $\alpha$ is within a region from 42.5° to 64.0°, internal reflection will occur within the glass plate when water is present or adheres thereon, while internal reflection will not occur when water is not present or does not adhere, i.e., the light inside the glass transmits to the outside through the water.

For causing such reflection, the incident angle upon the diffraction grating is adjusted. The incident angle upon the diffraction grating such that the reflection angle comes to be 42.5° within the glass is calculated by using equation (1). Upon a diffraction grating formed on the glass surface having a period of 1020 nm, the angle in question comes to be 22° when there is incident a plus primary (+1) lobe of diffracted light having a wavelength of 633 nm from a He-Ne laser.

For making the reflection angle 64.0° inside the glass, it is apparent from the same calculation that the incident angle upon the diffraction grating should be 45°. In the present embodiment, the light is incident upon the diffraction grating 5 at the angle of 45°. At this time, light which experiences total internal reflection exits from the other diffraction grating 6.

Moreover, in the case where a water drop W adheres or is present at the point where the total internal reflection occurs, the light which exits from the diffraction grating 6 is reduced, and in the case where water drops adhere at all of the points where internal reflection occurs, the output light is reduced to one-fiftieth (1/50).

Namely, it can be ascertained that the presence of the water on the glass surface can be sensitively detected so as to be indicated by the strength of the exit (transmitted) light. Further, when gradually increasing the incident angle upon the diffraction grating 5, the same phenomenon occurs.

However, when the incident angle is greater than 64°, the amount of exit light does not change even if one or more water drops are present or adhere to the glass. This is almost coincident with the angle where the condition of causing the internal reflection to occur inside does not change even if the water is present upon the surface.

Figure 4:
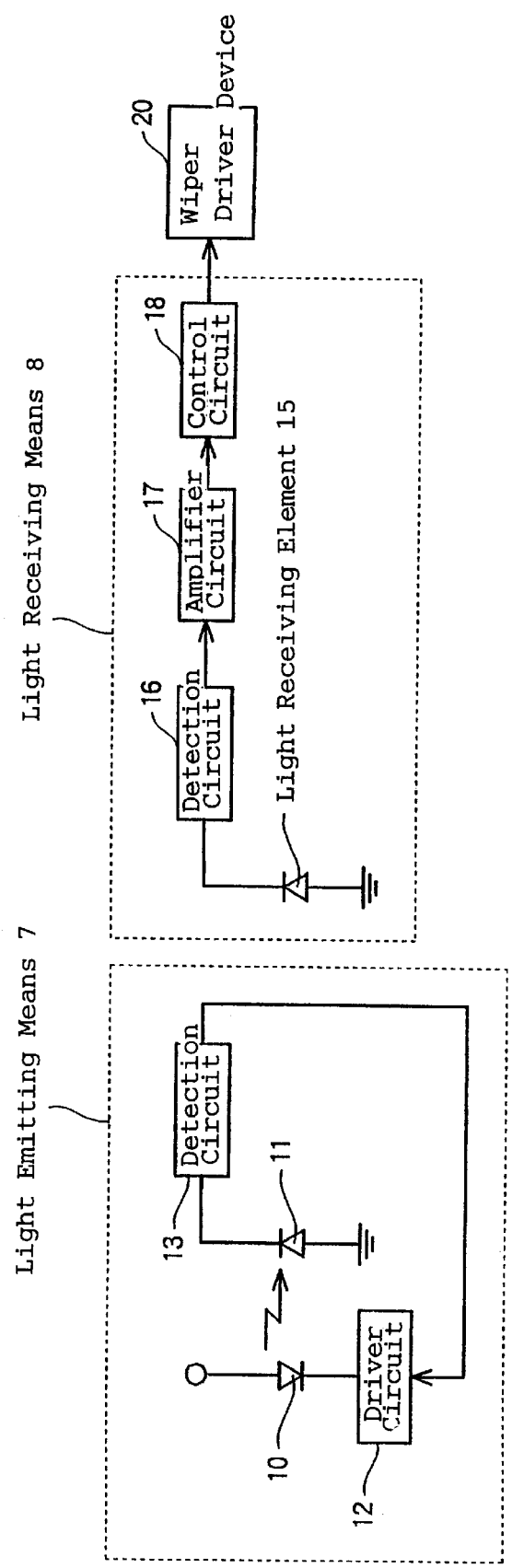
FIG. 4 shows construction of a light emitting means and a light receiving means, according to the present invention.

The light emitting means 7, as shown in FIG. 4, is constructed with a light emitting element 10, such as the LED or the LD; a receiving light sensing element 11 for detecting light output from the light emitting element 10, such as the PD; a driver circuit 12 for letting the light emitting element 10 output light which is modulated by a predetermined frequency; and a detection circuit 13 for outputting a signal corresponding to the modulated component from the output signal of the light sensing element 11.

Further, the signal output from the detection circuit 13 is fed back to the driver circuit 12 of the light emitting means 7.

With the water drop detector for transparent substrate according to the present invention, the signal corresponding to the modulated component from the output signal of the light sensing element 11 is fed through the detection circuit 13, and is fed back to the driver circuit 12 of the light emitting element 10 so as to control the light emitting output of the light emitting element 10 at a desired value.

Consequently, the light emitting output of the light emitting element 10 can be maintained at the desired value even if the ambient temperature around the light emitting means 7 changes.

The light receiving means, as shown in FIG. 4, is constructed with a light receiving element 15, such as the PD; a detection circuit 16 for outputting the signal corresponding to the component which is modulated by the driver circuit 12 of the light emitting element 10 from the output signal of the light receiving element 15; an amplifier circuit 17 for amplifying the signal output from the detection circuit 16; and a control circuit 18 for comparing the output of the amplifier circuit 17 with a predetermined reference voltage so as to output a first, a second, and a third signal with high sensitivity.

With the water drop detector for transparent substrate according to the present invention, the output light of the light emitting element 10 is modulated by the predetermined frequency, the signal corresponding to the modulated component of the light emitting element 10 from the output signal of the light receiving element 15 is output by the detection circuit 16, the output signal of the detection circuit 16 is amplified by the amplifier circuit 17, and the signal output from the amplifier circuit 17 is compared with a predetermined reference voltage, thereby enabling the control circuit 18 to output the first, the second, and the third signal with high sensitivity therefrom.

Additionally, the first, the second, and the third signals which are outputted from the control circuit 18 are inputted to a wiper driver device 20 so as to drive a wiper (or two or more wipers) at a wiper speed corresponding to the condition of adhesion of the water drops upon the windshield 1.

Accordingly, since only the signal corresponding to the modulated component of the light emitting element 10 is output from the light receiving element 15, the influence of any external ambient light can be eliminated.

Figure 5:
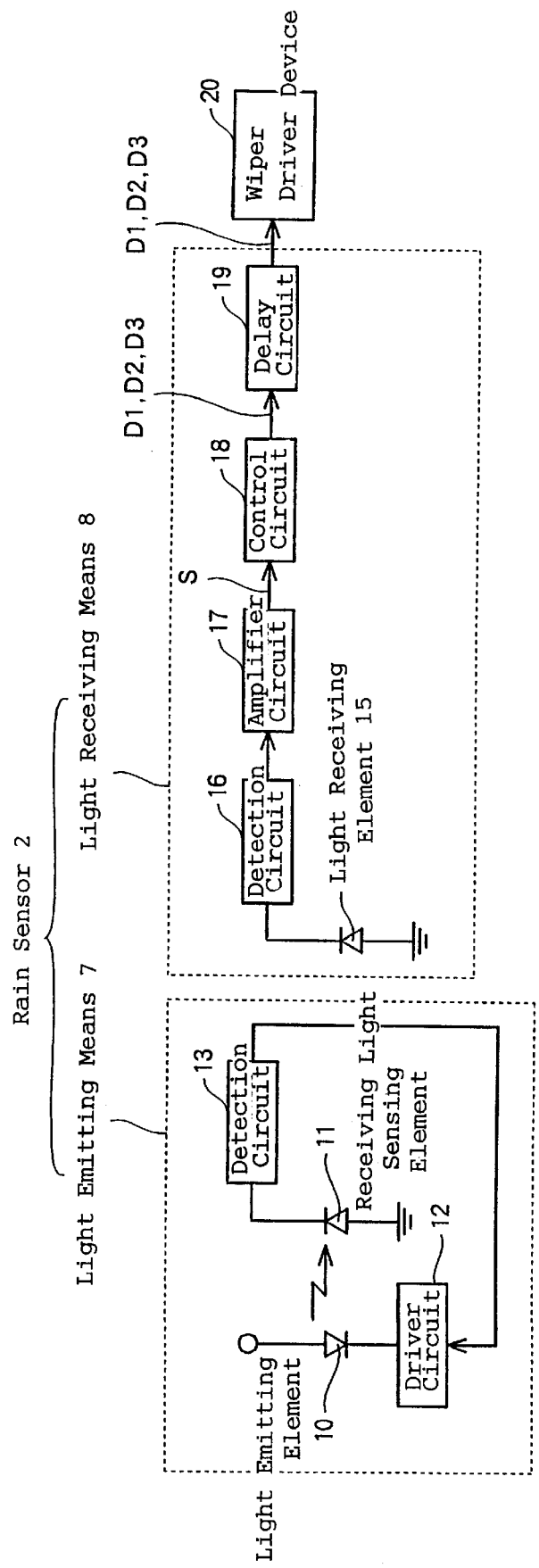
FIG. 5 shows a construction for implementing the initiating method of the water drop detector, according to the present invention.

A wiper control device for implementing an initializing method for the water drop detector according to the present invention, as is shown in FIG. 5, comprises the rain sensor 2 including the light emitting means 7 for guiding the light within the windshield 1 in such a manner that it causes the total internal reflection to occur at the interior surface of the windshield 1, the light receiving means 8 for receiving the light reflected within the windshield 1, and the wiper driver device 20 for driving the wiper 9 at a desired speed depending upon the output signal of the light receiving means 8.

The light emitting means 7, as in the same manner as shown in FIG. 4, is constructed with a light emitting element 10, such as the LED or the LD; a light sensing element 11 for detecting an output light of the light emitting element 10, such as the PD; the driver circuit 12 for outputting light which is modulated by a predetermined frequency of the light from the light emitting element 10; and the detection circuit 13 for outputting a signal corresponding to the modulated component from the output signal of the light sensing element 11. Also, the signal output from the detection circuit 13 is fed back to the driver circuit 12 of the light emitting means 7.

In the light emitting means 7, the signal corresponding to the modulated component is output from the light sensing element 11 by means of the detection circuit 13, and the signal is fed back to the driver circuit 12 so as to control the output of the light emission by the light emitting element 10. Thereby, it is possible to maintain the light emitting output of the light emitting element 10 at a desired value in spite of any change in the ambient temperature around the light emitting means 7.

Also, the light receiving means 8 is constructed with a light receiving element 15, such as the PD; a detection circuit 16 for outputting the signal corresponding to the component which is modulated by the driver circuit 12 of the light emitting element 10 from the light receiving element 15; the amplifier circuit 17 for amplifying the signal output from the detection circuit 16; the control circuit 18 for processing the output signal S of the amplifier circuit 17 so as to output signals of three kinds (the first output signal D1, the second output signal D2, and the third output signal D3), a delay circuit 19 for delaying the output signals D1, D2, and D3 of the control circuit 18 only when the rain sensor 2 is turned on (connected) to the power source (i.e., initiation); and the wiper driver device 20 for driving the wiper 9 depending on the output signals of the delay circuit 19.

The detection circuit 16 outputs only the signal corresponding to the modulated component of the light emitting element 10 from the output of the light receiving element 15, and the signal is inputted through the amplifier circuit 17 and the control circuit 18 into the wiper driver device 20, thereby avoiding malfunction caused by detecting ambient light, which can reach up to one hundred and fifty thousand (150,000) lux under strong sunshine in mid-summer, for instance, while it reaches only to several lux in darkness in the middle of night.

The control circuit 18 sequentially compares the output signal S with the three-stage reference voltage (a first preset level R1, a second preset level L2, and a third preset level L3 in the order of height thereof), respectively.

In the rain sensor 2 used in the present invention, as is mentioned above, the more that the water drops adhere upon, or are present upon, the front surface of the windshield 1, the lower the output level of the light receiving element 15. Therefore, the output signal S is at the highest voltage level when no water drops adhere on the front surface of the windshield 1, and is at the lowest voltage level when many water drops adhere upon the front surface of the windshield 1.

Moreover, the first output signal D1 turns to level H when the output signal S of the amplifier circuit 17 is smaller than the first preset level R1 (S<R1), the second output signal D2 turns to level H when the output signal S is smaller than the second preset level R2 (S<R2), and further the third output signal D3 turns to level H when the output signal S is smaller than the third preset level R3 (S<R3).

Here, in the case where the first output signal D1 is at level H, it indicates a condition corresponding to a rainfall that is a misty or drizzling rain, in the case where the second output signal D2 is at level H, it indicates corresponding to a rainfall that is of middle strength, and in the case where the third output signal D3 is at level H, it indicates that the rainfall is a heavy rain, respectively.

The delay circuit 19 comprises an on-delay timer which is activated when the rain sensor 2 is turned on by the power source, and logic product circuits (i.e., plural AND circuits). The three kinds of output signals D1, D2 and D3 provided by the control circuit 18 are inputted into the AND circuits with an output signal of the on-delay timer, and output signals of the AND circuits are inputted into the wiper driver device 20. However, the length of delay-time DT of the on-delay timer is a time that is necessary for the rain sensor 2 to switch from a transient condition, when turning the rain sensor 2 on by the power source, into a static condition, and it is sufficient if it is a few seconds, for example.

Consequently, upon the turning on of the rain sensor 2, when the rain drops do not adhere to or are not present upon the front surface of the windshield 1, the wiper 9 will not be driven until the output signal of the on-delay timer switches to the H level, even if the output signal S of the amplifier circuit 17 transiently decreases below the third preset level R3 and even if the third output signal D3, as the starting condition for driving the wiper 9, switches to the H level.

Also, after passing the delay-time DT following the turning-on of the rain sensor 2, when all the output signals D1, D2, and D3 of the control circuit 18 switch to the H level, since the water drops adhere to or are present upon the front surface of the windshield 1, the drive signal WD for the wiper 9 is outputted from the wiper driver device 20 so as to begin driving of the wiper 9.

After that, even if the third output signal D3 switches to the L level, the drive signal WD for the wiper 9 continues to be provided as long as the second output signal D2 is at the H level, and the drive signal WD for the wiper 9 is stopped when the second output signal D2 reaches the L level.

Accordingly, the wiper control device starts the driving of the wiper 9 at such a timing when the third output signal D3 switches to the H level and stops -the driving of the wiper 9 at such a timing when the second output signal D2 switches to the L level.

Further, upon the turning-on of the rain sensor 2, it is also possible to maintain at least the voltage level of the output signal S higher than that of the third preset level R3, with which the third output signal D3 as the starting condition for driving the wiper 9 switches to the H level, for a predetermined time period.

Figure 6:
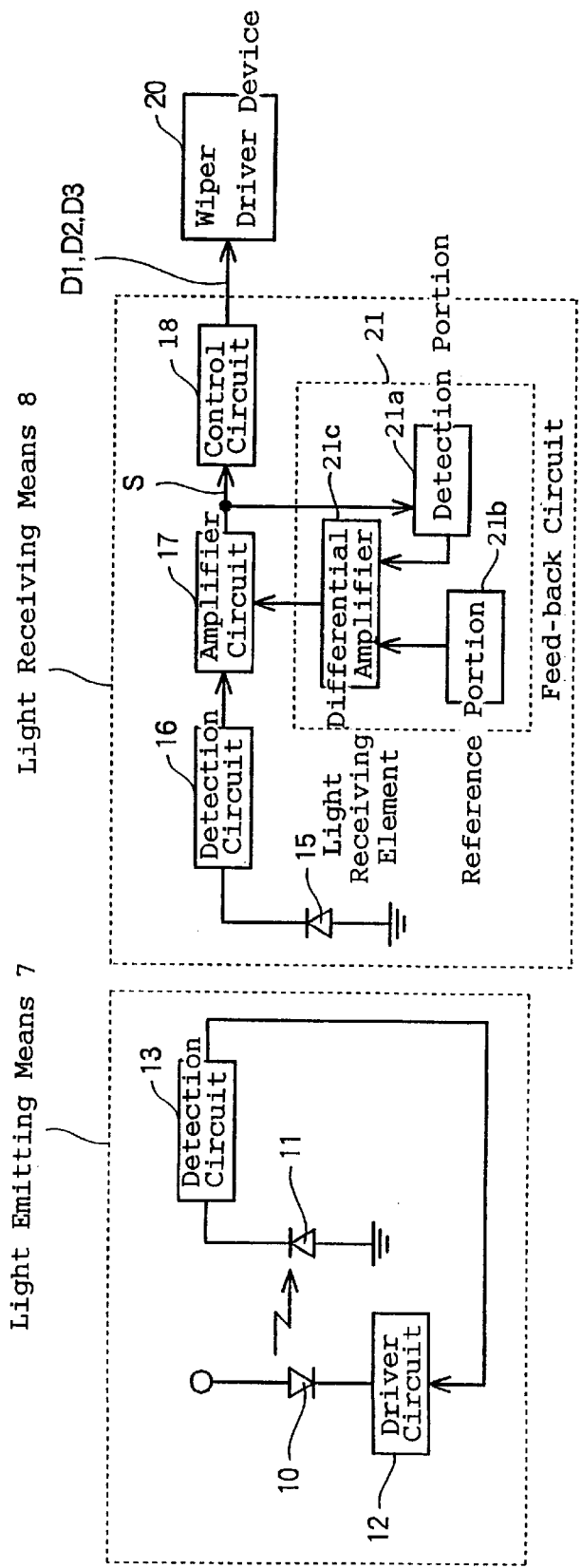
FIG. 6 shows a construction for implementing the output stabilizing method of the water drop detector, according to the present invention.

A construction for implementing the output stabilizing method of the water drop detection device according to the present invention, as is shown in FIG. 6, comprises the rain sensor 2 including the light emitting means 7 for guiding the light within the windshield 1 in such a manner that it causes the internal reflection upon the interior surface of the windshield 1, the light receiving means 8 for receiving the light reflected within the windshield 1, and the wiper driver device 20 for driving the wiper 9 at a desired speed depending upon the output signal of the light receiving means 8.

The light emitting means 7, in the same manner as shown in FIG. 4 or 5, is constructed with the light emitting element 10, such as the LED or the LD; the light sensing element 11 for detecting the output light of the light emitting element 10, such as the PD; the driver circuit 12 for outputting light which is modulated by the predetermined frequency of the light from the light emitting element 10; and, the detection circuit 13 for outputting a signal corresponding to the modulated component from the signal output from the light sensing element 11. Also, the output signal of the detection circuit 13 is fed back to the driver circuit 12 of the light emitting means 7.

In the light emitting means 7, the signal corresponding the modulated component is output from the light sensing element 11 by means of the detection circuit 13, and the signal is fed back to the driver circuit 12 so as to control the output of the light emission by the light emitting element 10, and thereby it is possible to maintain the light emitting output of the light emitting element 10 at a desired value in spite of any change in the ambient temperature around the light emitting means 7.

Also, the light receiving means 8 is constructed with the light receiving element 15, such as the PD; the detection circuit 16 for outputting the signal corresponding to the component which is modulated by the driver circuit 12 of the light emitting element 10 from the output signal of the light receiving element 15; the amplifier circuit 17 for amplifying the output signal of the detection circuit 16; a feedback circuit 21 for maintaining the output signal S of the amplifier circuit 17 when no water drops adhere on, or are present on, the front surface of the windshield 1; and, the control circuit 18 for processing the output signal S of the amplifier circuit 17 so as to output (i.e. switching into the ON state) the three kinds of signals (the first output signal D1, the second output signal D2 and the third output signal D3).

The ON state means an H level (a high level) if it is at a positive logic level and is an L level (a low level) if it is at a negative logic level.

The detection circuit 16 outputs only the signal corresponding to the modulated component of the light emitting element 10 output from the light receiving element 15, and the signal is inputted through the amplifier circuit 17 and the control circuit 18 into the wiper driver device 20, thereby preventing such malfunctions as caused by the influence of ambient light, which, as mentioned previously, reaches to one hundred and fifty thousand (150,000) lux under strong sunshine in mid-summer, for instance, while it reaches only several lux in darkness in the middle of night.

The feedback circuit 21 is constructed with a detection portion 21*a* for detecting (or sampling) the output signal S of the amplifier circuit 17, a reference portion 21*b* for providing a reference voltage VR corresponding to the output signal S desired when no water drops adhere on the front surface of the windshield 1, and a differential amplifier 21*c* for amplifying the voltage difference (VR−S=ΔV) between the reference voltage VR and the output signal S so as to output it to the amplifier circuit 17.

The timing when the difference voltage ΔV between the reference voltage VR and the output signal S is fed back, i.e., the timing when the feedback circuit 21 operates, is when no water drops adhere to or are present on the front surface of the windshield 1 (ordinarily, when the wiper 9 is not driven), and it is ordinarily a constant time period. For example, it can be conducted at one (1) minute intervals.

If the wiper 9 is driven at the point in time when the feedback is conducted, the feedback circuit 21 does not operate, however, the feedback is conducted by operating the feedback circuit 21 at the point when the wiper 9 stops being driven or when the constant time period has passed after the stoppage thereof. At this moment, it is adjustable whether the feedback should be conducted immediately after the stoppage of driving the wiper 9 or if it should be conducted after the passage of the constant time period from the time of the stoppage thereof.

The amplifier circuit 17 receives the output signal of the feedback circuit 21 and varies an amplification factor thereof so that the output signal S comes to be equal to the reference voltage VR.

Accordingly, when the outer surface of the windshield 1 has water drops thereon, when the light receiving output of the light receiving means 8 fluctuates for any reason (for instance, due to the change of time passage in the output of the light emitting element 10), when the amplification factor of the circuit fluctuates due to any change of ambient temperature, or when outside noise signals cause fluctuation, the output signal S is maintained at a constant value.

Further, it is possible to store in a memory (not shown in the figure) the difference voltage ΔV at a point just before the rain sensor 2 enters the stopping condition (for example, when the engine of the vehicle equipped with the invention is stopped) so as to feed back the above-mentioned difference voltage V when the rain sensor 2 is activated the next time.

The control circuit 18 first compares the output signal S with the three-stage reference voltage (the first preset level R1, the second preset level L2, and the third preset level L3 in the order of height thereof), sequentially.

In the rain sensor 2 used in the present invention, as is mentioned above, the more that water drops adhere to or are present on the front surface of the windshield 1, the lower the output level of the light receiving element 15. Therefore, the output signal S is at the highest voltage level when no water drops adhere or are present on the front surface of the windshield 1, and is at the lowest voltage level when a large quantity of water drops adhere to or are present on the front surface of the windshield 1.

In addition, it switches the first output signal D1 to the H level when the output signal S of the amplifier circuit 17 is smaller than the first preset level R1 (S<R1), the second output signal D2 to the H level when the output signal S is smaller than the second preset level R2 (S<R2), and further, the third output signal D3 to the H level when the output signal S is smaller than the third preset level R3 (S<R3).

Here, in the case where the first output signal D1 is in the H level, the rainfall condition is indicated as corresponding to a misty or drizzling rain; in the case where the second output signal D2 is in the H level, the rainfall condition corresponds to a medium rainfall; and, in the case where the third output signal D3 is in the H level, a very heavy rainfall condition is indicated, respectively.

Also, when all output signals D1, D2, and D3 of the control circuit 18 switch to the H levels, the drive signal WD for the wiper 9 is outputted so as to begin driving the wiper 9. After that, even if the third output signal D3 switches to the L level, the drive signal WD for the wiper 9 continues to be provided as long as the second output signal D2 is in the H level, and the drive signal WD for the wiper 9 is stopped when the second output signal D2 switches to the L level.

Accordingly, the driving of the wiper 9 is started at the time when the third output signal D3 switches to the H level and the driving of the wiper 9 is stopped at the time when the second output signal D2 switches to the L level.

In this manner, the amplification factor of the amplifier circuit 17 is adjusted by the feedback circuit 21 at a predetermined timing so that the output signal S of the amplifier circuit 17 comes to be a constant value. Therefore, the output signal S is compared with the preset voltages R1, R2 and R3 which are previously set, with certainty, and thereby it is possible to drive the wiper 9 depending on the condition of rainfall.

Finally, it should be noted that in this specification, although water in the form of drops is recited, the water that adheres to or is present on the surface of the windshield may be in other forms as well, so long as the total internal reflection phenomenon can occur.

What is claimed is:

1. A method for initiating a rain sensor which detects an amount of water drops adhering to or present upon a front surface of a windshield and outputs a driving signal to a wiper driver device, comprising a light emitting means for guiding light into said windshield so as to cause internal reflection to occur upon interior surfaces thereof; and a light receiving means for receiving the light reflected within said windshield, wherein an output signal of said light receiving means is inputted into the wiper driver device through a delay means when initiating the rain sensor said delay means is an on-delay timer.

2. A method for stabilizing an output of a rain sensor which detects an amount of water drops adhering to or present upon a front surface of a windshield and outputs a driving signal to a wiper driver device for driving a wiper, comprising a light emitting means for guiding light into said windshield so as to cause internal reflection to occur upon interior surfaces thereof; and a light receiving means for receiving means for receiving the light reflected within said windshield, wherein an amplification factor of an amplifier circuit of said light receiving means is adjusted so that an output signal of said amplifier circuit is a constant value when no water drops adhere to or are present upon the front surface of said windshield, said adjustment of the amplification factor is conducted by feeding back a difference signal between a reference value and the output signal of said amplifier circuit, the difference signal being stored in a memory just before said rain sensor is in a stop condition and fed back when said rain sensor is initiated again.

3. A method for stabilizing an output of a rain sensor as described in claim 2, wherein the above feedback is conducted with a constant time period.

4. A method for stabilizing an output of a rain sensor as described in claim 2, wherein the above feedback is conducted when the wiper is not driven.

* * * * *